(12) United States Patent
Ahmed

(10) Patent No.: US 7,816,286 B1
(45) Date of Patent: Oct. 19, 2010

(54) THERMOPLASTIC COMPOSITION FOR WALLPAPER AND THE WALLPAPER INCLUDING THE SAME

(75) Inventor: Sharf U. Ahmed, Woodbury, MN (US)

(73) Assignee: H. B. Fuller Company, St. Paul, MN (US)

( * ) Notice: Subject to any disclaimer, the term of this patent is extended or adjusted under 35 U.S.C. 154(b) by 0 days.

(21) Appl. No.: 12/276,551

(22) Filed: Nov. 24, 2008

Related U.S. Application Data

(60) Provisional application No. 60/991,516, filed on Nov. 30, 2007.

(51) Int. Cl.
*B32B 5/18* (2006.01)

(52) U.S. Cl. ............... 442/76; 525/173; 428/904.4; 428/908.8

(58) Field of Classification Search .......... 442/76, 442/93, 85, 86, 79
See application file for complete search history.

(56) References Cited

U.S. PATENT DOCUMENTS

| 5,726,220 | A | | 3/1998 | Tokushige et al. |
| 5,827,252 | A | * | 10/1998 | Werenicz et al. ............ 604/367 |
| 6,573,340 | B1 | | 6/2003 | Khemani et al. |
| 6,869,985 | B2 | | 3/2005 | Mohanty et al. |
| 7,241,838 | B2 | * | 7/2007 | Shelby et al. ............... 525/173 |
| 7,256,223 | B2 | | 8/2007 | Mohanty et al. |
| 7,297,394 | B2 | | 11/2007 | Khemani et al. |
| 7,354,656 | B2 | | 4/2008 | Mohanty et al. |
| 7,368,511 | B2 | | 5/2008 | Hale et al. |
| 7,405,009 | B2 | * | 7/2008 | Ahmed et al. ............... 428/522 |
| 2008/0125532 | A1 | | 5/2008 | Nelson |

* cited by examiner

*Primary Examiner*—Lynda Salvatore

(57) ABSTRACT

Disclosed is a thermoplastic composition that includes at least about 40% by weight a polyester and at least about 10% by weight a thermoplastic polymer that is different from the aforesaid polyester. The polyester includes at least one of an aliphatic-aromatic copolyester, a polylactic acid polyester, and a compound of an aliphatic-aromatic copolyester and a polylactic acid polyester. The thermoplastic polymer has a melt index of at least about 40 g/10 min, The thermoplastic composition has a melt index of at least about 10 g/10 min. Also disclosed are articles (e.g., wallpaper) that include a substrate and the thermoplastic composition disposed on the substrate.

19 Claims, No Drawings

THERMOPLASTIC COMPOSITION FOR WALLPAPER AND THE WALLPAPER INCLUDING THE SAME

CROSS REFERENCE TO RELATED APPLICATIONS

This Application claims the benefit of U.S. Provisional Application No. 60/991,516, filed Nov. 30, 2007, which is incorporated herewith.

BACKGROUND

The invention relates to a thermoplastic composition and its use on substrates in general and wallpaper in particular.

Wallpaper products are often coated with surface treatment compositions designed to improve wear and stain resistance including resistance to liquids such as water, grease and oil. Such wallpaper treatment compositions include fluorochemicals, water-based styrene-butadiene latex binders, water-based acrylic and vinyl acetate-based binders, and polyvinyl chloride.

SUMMARY

In one aspect, the invention features a coated substrate that includes a substrate, and a coating composition disposed on the substrate. The coating composition includes at least about 40% by weight a polyester that includes at least one of an aliphatic-aromatic copolyester, a polylactic acid polyester, and a compound of an aliphatic-aromatic copolyester and a polylactic acid polyester, and at least about 10% by weight a thermoplastic polymer that is different from the aforesaid polyester and that has a melt index of at least 40 g/10 min at 190° C. The coating composition has a melt index of at least about 10 g/10 min at 190° C. In one embodiment, the aforesaid polyester is a biodegradable polyester.

In one embodiment, the coating composition consists essentially of from about 40% by weight to about 90% by weight the aforesaid polyester, and from about 10% by weight to about 60% by weight the aforesaid thermoplastic polymer. In some embodiments, the coating composition has a melt index that is greater than the melt index of the polyester. In one embodiment, the coated substrate is wallpaper.

In another aspect, the invention features a method of making the coated substrate that includes coating a substrate with the aforesaid coating composition. In one embodiment, the method further includes embossing the coated substrate. In some embodiments, the method further includes printing the coated substrate using ink or other printing methods. In one embodiment, the method is to make wallpaper.

In other aspects, the invention features a method of using the wallpaper. The method includes adhering a sheet of the wallpaper to the surface of a wall. The sheet of the wallpaper includes a first wall-contacting surface and a second exposed surface that includes a coating that includes the aforesaid coating composition.

In another aspect, the invention features a thermoplastic composition that includes at least about 40% by weight of a polyester including at least one of an aliphatic-aromatic copolyester, a polylactic acid polyester, a compound of an aliphatic-aromatic copolyester and a polylactic acid polyester, and at least about 10% by weight thermoplastic polymer that is different from the aforesaid polyester and that has a melt index of at least about 40 g/10 min. The thermoplastic composition has a melt index of at least about 10 g/10 min at 190° C. In some embodiments, the thermoplastic composition has a melt index that is greater than the melt index of the polyester. In one embodiment, the aforesaid polyester is a biodegradable polyester.

In other aspects, the invention features an article that includes a substrate, and the aforesaid thermoplastic composition disposed on the substrate. In one embodiment, the article is wallpaper.

In yet other aspects, the invention features a method of making an article including applying the aforesaid thermoplastic composition to a substrate to form a coating on the substrate. In one embodiment, the coating is non-shrinkable under heat and/or stress.

In one aspect, the invention features a thermoplastic composition that includes at least one of the aforesaid polyesters, yet exhibits a viscosity that is lower than the viscosity of the neat aforesaid polyester, which enables the thermoplastic composition to be applied as a flexible coating using standard coating techniques including, e.g., slot die coating.

The thermoplastic composition adheres well to substrates such as wallpaper substrates and exhibits wear resistance, stain resistance, and cleanability. The composition can also be formulated such that a coating formed therefrom exhibits moisture vapor permeability and may even exhibit good breathability. Certain formulations of the composition can also provide a wallpaper coating that is free of volatile organic compounds.

Other features and advantages will be apparent from the following description of the preferred embodiments and from the claims.

GLOSSARY

In reference to the invention, these terms have the meanings set forth below:

The term "wallpaper" refers to a sheet-like construction that is suitable for covering vertical surfaces (e.g., walls), horizontal surfaces (e.g., floors and ceilings) or both.

The term "exposed" means available for contact by an individual.

The term "biodegradable" means capable of being decomposed by biological agents, especially bacteria. According to American Society for Testing and Materials, biodegradable is defined as "a degradation caused by biological activity, especially by enzymatic action, leading to a significant change in the chemical structure of the material"; and The European Union deems a material biodegradable if it will break down into mostly water, carbon dioxide and organic matter within six months, both of which are also incorporated herein.

DETAILED DESCRIPTION

The coated substrate includes a coating that includes a thermoplastic coating composition disposed on a substrate. The composition includes a blend of a polyester and a thermoplastic polymer that is different from the aforesaid polyester. The aforesaid polyester includes at least one of aliphatic-aromatic copolyester, a polylactic acid polyester, and a compound of aliphatic-aromatic copolyester and polylactic acid polyester.

The composition preferably exhibits a melt index of at least about 10 grams/10 minutes (g/10 min), or at least about 25 g/10 min, or at least about 30 g/10 min, or even at least about 40 g/10 min at 190° C. In some embodiments, the composition exhibits a melt index that is greater than the melt index of the aforesaid polyester.

The coating formed from the thermoplastic coating composition is very flexible, and preferably exhibits sufficient breathability such that, when present on wallpaper substrate, the coating allows moisture from water-based or moisture activated adhesives to pass there through, thereby increasing the rate at which the adhesives dry. In some embodiments, the coatings exhibit a moisture vapor transmission rate of at least about 100 g/m²/day.

The coating preferably is printable such that ink can be applied to (e.g., printed on) the coating and will remain on the coating in the as applied form (e.g., exhibiting crisp lines and a continuous coating). The coating also preferably can undergo an embossing process without fragmenting, cracking, or breaking and without sticking to the embossing device.

The coating preferably is non-shrinkable under heat and/or stress.

Suitable aliphatic-aromatic copolyesters include, e.g., poly (tetramethylene adipate-co-terephthalate), poly(ethylene glutarate-co-terephthalate), poly(tetramethylene glutarate-co-terephthalate), poly(tetramethylene glutarate-co-terephthalate-co-diglycolate), poly(ethylene adipate-co-terephthalate), poly(tetramethylene succinate-co-terephthalate), poly (ethylene glutarate-co-naphthalene dicarboxylate, poly (tetramethylene glutarate-co-naphthalene dicarboxylate), poly(tetramethylene adipate-co-naphthalene dicarboxylate, poly(ethylene adipate-co-naphthalene dicarboxylate), poly (tetramethylene succinate-co-naphthalene dicarboxylate) and poly(ethylene succinate-co-naphthalene dicarboxylate. Preferably the aliphatic-aromatic copolyester is poly(tetramethylene adipate-co-terephthalate), examples of which are commercially available, e.g., under the ECOFLEX family of trade designations from BASF Chemical Company (Florham Park, N.J.).

Useful aliphatic-aromatic copolyesters preferably exhibit a melt index of no greater than about 40 g/10 min, or no greater than about 30 g/10 min, or no greater than about 20 g/10 min, or no greater than about 10 g/10 min, or even no greater than about 8 g/10 min at 190° C.

Suitable polylactic acid polyesters include those that have a melt index of at least about 10 g/10 min, or at least about 20 g/10 min, or at least about 40 g/10 min., or no greater than about 100 g/10 min, or no greater than about 80 g/10 min at 190° C.

Examples of useful commercially available polylactic acid polyesters include, e.g., those sold under the trade designations of NATUREWORK 6251 D, 4060 D, and 6302 D from NatureWork LLC (Minnetonka, Minn.)

Suitable compounds of aliphatic-aromatic copolyester and polylactic acid polyester include those that have a melt index of at least about 2 g/10 min at 190° C.

One commercially available compound of aliphatic-aromatic copolyester and polylactic acid polyester is sold under the trade designation of ECOVIO L BX 8145 from BASF Chemical Company.

The polyester is preferably present in the composition in an amount from about 40% by weight to about 90% by weight, or from about 50% by weight to about 90% by weight, or from about 65% by weight to about 90% by weight, or even from about 70% by weight to about 85% by weight, based on the total weight of the composition.

The thermoplastic polymer refers to those thermoplastic polymers that are different from the aforesaid polyester. Suitable thermoplastic polymers include e.g., ethylene vinyl acetate copolymers; polyesters other than the aforesaid polyester including e.g., non-breathable polyesters as well as breathable polyesters (e.g., polyether copolyesters); polyamides including e.g., non-breathable polyamides as well as breathable polyamides (e.g., polyether copolyamides); copolymers of acrylic acid; ethylene copolymers of acrylic acid e.g., ethylene acrylic acid, ethyl(meth)acrylate, ethylene n-butyl acrylate, ethylene vinyl acetate carbon monoxide copolymers, ethylene n-butyl acrylate carbon monoxide copolymers; polyolefins (e.g., polyethylene and polypropylene); modified polyethylene; modified polypropylene; styrene block copolymers including, e.g., styrene-butadiene-styrene, styrene-isoprene-styrene, styrene-ethylene-propylene-styrene, and styrene-ethylene-butene-styrene block copolymers; and combinations thereof. Useful thermoplastic polymers exhibit a melt index of at least 10 g/10 min, or at least about 20 g/10 min, or at least about 30 g/10 min, or at least about 50 g/10 min, or even at least about 100 g/10 min at 190° C.

The thermoplastic polymer is preferably present in the composition in an amount from about 10% by weight to about 60% by weight, or from about 10% by weight to about 40% by weight, or even from about 15% by weight to about 30% by weight, based on the total weight of the composition. When the thermoplastic polymer is nonpolar in nature, the nonpolar thermoplastic polymer is preferably present in the composition in an amount of from about 10% by weight to about 30% by weight.

In some embodiments, the thermoplastic polymers include ethylene vinyl acetate copolymers. Useful ethylene vinyl acetate copolymers include those that have vinyl acetate content of at least about 18% by weight, at least about 25% by weight, at least about 30% by weight, at least about 40% by weight, or even from about 18% by weight to about 80% by weight. Useful ethylene vinyl acetate copolymers also include those that have a melt index of at least about 40 g/10 min, or at least about 50 g/10 min, or at least about 100 g/10 min, or at least about 150 g/10 min at 190° C.

Examples of suitable commercially available ethylene vinyl acetate copolymers include those sold under the ATEVA series of trade designations e.g., ATEVA 1850A (ethylene vinyl acetate copolymer having a vinyl acetate content of 18% and a melt index of from 150 g/10 min), ATEVA 2830A (ethylene vinyl acetate copolymer having a vinyl acetate content of 28% and a melt index of 150 g/10 min), and ATEVA 3325AC (ethylene vinyl acetate copolymer having a vinyl acetate content of 33% and a melt index of 43 g/10 min), as well as ATEVA 1880A, 2850A and 4030AC, all of which are available from AT Plastics, Inc. (Brampton, Ontario, Canada); those sold under the trade designation ELVAX 205 from E.I. du Pont; those sold under the EVATANE series of trade designations including, e.g., EVATANE 28-800 and 28-420 from AtoFina Chemicals (Philadelphia, Pa.), and those sold under the LEVAMELT series of trade designations e.g., LEVAMELT 800, LEVAMELT 456, and LEVAMELT KA8896 from Bayer Corporation (Pittsburgh, Pa.).

The composition can optionally include other components including, e.g., fire retardants, tackifying agents, plasticizers, waxes, fillers, antioxidants, UV stabilizers, and combinations thereof. Suitable fillers include, e.g., gypsum, talc, mica, carbon black, wollastonite, chalk, diatomaceous earth, sand, gravel, crushed rock, bauxite, limestone, sandstone, aerogels, xerogels, gypsum dihydrate, calcium aluminate, magnesium carbonate, ceramic materials, pozzolamic materials, zirconium compounds, xonotlite, silicat, perlite, vermiculite, pumice, perlite, zeolites, clay (e.g., nanoclay and surface modified nanoclay), montmorillonite minerals, kaolin clay, organoclays, clays that have been surface treated with silanes and stearic acid, smectite clays, magnesium aluminum silicate, bentonite clays, hectorite clays, silicon oxide, calcium terephthalate, aluminum oxide, titanium dioxide, iron oxides, calcium phosphate, barium sulfate, sodium carbonate, magnesium sulfate, aluminum sulfate, magnesium carbonate, barium carbonate, calcium carbonate, calcium oxide, calcium hydroxide, magnesium oxide, aluminum hydroxide, calcium sulfate, barium sulfate, lithium fluoride, polymer particles, powdered metals, pulp powder, cellulose, starch, chemically modified starch, thermoplastic starch, chitin, chitosan, keratin, glass (e.g., glass beads, hollow glass bubbles, glass fibers), microspheres, porous ceramic spheres, seagel, cork, natural fibers such as sisal, hemp, cotton, wool, wood, flax, abaca, sisal, ramie, bagasse, and cellulose fibers, carbon fibers, graphite fibers, silica fibers, ceramic fibers, metal fibers, stainless steel fibers, recycled paper fibers, and combinations thereof. In one embodiment, the composition includes fillers e.g., clay and glass.

The composition is useful in a variety of forms including, e.g., continuous films and coatings, and in a variety of applications including being disposed on a substrate (e.g., as a coating or a film that is not shrinkable under heat and/or stress). Preferably the composition adheres to the substrate, mechanically interlocks with the substrate (e.g., the fibers of the substrate), and forms an adhesive bond with the substrate.

Suitable methods for applying the composition to a substrate include, e.g., curtain, gravure, slot die coating, hot melt, extrusion, laminating, and combinations thereof. Useful noncontact coating methods include those coating methods described in U.S. Pat. No. 6,843,874 and incorporated herein. The composition can be provided as a coating having any desired coat weight including, e.g., at least about 25 g/m$^2$, at least about 50 g/m$^2$, at least about 100 g/m$^2$, at least about 200 g/m$^2$, or even at least about 500 g/m$^2$.

The composition is well suited for use as an external, exposed coating on substrates including a wallpaper substrate. Examples of wallpaper substrates include paper, polymer films, woven fabric, nonwoven webs (e.g., wet laid, dry laid and air laid nonwoven webs), acrylic, polyolefin, vinyl coated paper, coated fabric, laminates that include multiple layers including, e.g., paper layers, polymer layers, fibrous layers (e.g., synthetic and natural), grass paper, (e.g., paper backed vinyl/solid sheet vinyl), laminates that include a solid vinyl layer laminated or bonded to a paper backing, fabric backed vinyl, vinyl film laminated to a fabric or paper substrate, and wall coverings that include threads laminated to a paper substrate. One example of a suitable wallpaper substrate is a wet laid nonwoven web that includes wood pulp and thermoplastic polymer (e.g., polyester, nylon, rayon and combinations thereof).

In the embodiments when the coated substrate is wallpaper, the wallpaper may also include components that provide an aesthetic or textured appearance including, e.g., threads, fibers (e.g., natural fiber, e.g., silk, cotton and linen), vines, jute, wool, grass (e.g., sea grass), coir, cork, hemp, and sisal, and synthetic fibers), flocked appearance (e.g., fibers set in a binder to provide the appearance of velvet or damask or to create a three dimensional effect), thin sheets of meal foil (e.g., aluminum foil), cork and cork veneer, wood veneer, cotton scrim, woven fiberglass, and combinations thereof. Wallpaper may also be treated to achieve a desired aesthetic appearance. Such treatments include embossing, expansion and printing, and can produce a variety of wall covering products including, e.g., expanded vinyl, and wall coverings with a noise reduction coefficient rating, e.g., for sound absorption.

Wallpapers can be of a variety of dimensions and are available in a variety of forms including sheets and rolls. Useful wallpapers have a width of at least three inches, or at least five inches, or at least 10 inches, or at least 20 inches, or at least 40 inches or even at least 200 inches, and a length of at least 10 feet, or at least 15 feet, or at least 18 feet, or even at least 25 feet.

The wallpaper can optionally include an adhesive composition disposed on a major surface of the wallpaper substrate opposite the major surface that includes the thermoplastic composition. Examples of suitable adhesive compositions include removable adhesive compositions, repositionable pressure sensitive adhesive compositions, cellulose-based adhesive compositions (e.g., cellulose methyl ether, wheat flour-based adhesive compositions, vinyl-based adhesive compositions (including, e.g., clay-vinyl adhesives) and combinations thereof. Other wallpaper adhesive compositions are described in U.S. Pat. Nos. 6,894,095, 6,984,428, 5,409,189, and 4,916,182 and incorporated herein. Useful adhesive compositions can be pre-applied, i.e., applied at the manufacturer, applied by the user, and combinations thereof. Useful adhesive compositions can also be activated, i.e., made tacky, through a variety of mechanisms including contact with a liquid, e.g., water, organic solvent and combinations thereof.

In one application, an adhesive composition is applied to, or activated on (e.g., by the addition of water) a major surface of the wallpaper opposite the thermoplastic coating. A surface (e.g., a vertical surface, e.g., a wall, or a horizontal surface e.g., ceiling or a floor) is contacted with the adhesive composition of the wallpaper to adhere the wallpaper to the surface. The surface can be in any of a variety of structures including, e.g., a home, an office building, a hospital, a sports arena, a store, and a tent, and in any of a variety of forms and compositions including, e.g., wallboard, sheet rock, wood, ceramic, glass, and combinations thereof.

Although the thermoplastic composition has been described herein with respect to the wallpaper, the composition is also useful as a coating or a continuous film on a variety of substrates including, e.g., porous substrates, fibrous substrates, and combinations thereof. Examples of such substrates include paper, woven webs (e.g., fabric and textiles), nonwoven webs, tissues, and substrates used in the construction of disposable articles including, e.g., sanitary napkins, panty liners, tampons, training pants, incontinent products, bandages, surgical dressings, and diapers. The coated substrates can be used in a variety of applications. The coated substrates can be further treated with a variety of processes and treatments including, e.g., printing, embossing, and combinations thereof.

The invention will now be described by way of the following examples. All amounts are by weight unless otherwise indicated.

EXAMPLES

Test Procedures

Test procedures used in the examples include the following.

Melt Index Test Method

The melt index is determined according to ASTM method D-1238-04c entitled, "Test Method for Melt Flow Rates of Thermoplastic by Extrusion Plastorneter," at 190° C. using a 2.16 kg weight. The melt index of two samples is measured and the average value is reported in grams per 10 minutes (g/10 min).

Differential Scanning. Calorimetry (DSC)

The DSC scan is run on a sample according to the following procedure using a Perkin Elmer DSC 7 Differential Scanning Calorimeter from Perkin Elmer (Waltham, Mass.): The sample is heated from 25° C. to 160° C. at 40° C./min, held for 5.0 minutes at 160° C., cooled from 160° C. to −60° C. at 200° C./min, held at 5 minutes at −60° C., heated from −60° C. to 160° C. at 10° C./min, held for 5.0 min at 160° C., and cooled from 160° C. to −60° C. at 10° C./min.

EXAMPLES

Control 1

Neat ECOFLEX F BX 7011 aliphatic-aromatic copolyester (BASF, Corporation, Florham Park, N.J.).

Example 1

A thermoplastic composition is prepared that includes 2700 g ECOFLEX F BX 7011 aliphatic-aromatic copolyester (BASF, Corporation, Florham Park, N.J.) and 2700 g ATEVA 2830A ethylene vinyl acetate (AT Plastics, Inc., Brampton, Ontario, Canada).

Example 2

A thermoplastic composition is prepared that includes 3750 g ECOFLEX F BX 7011 aliphatic-aromatic copolyester (BASF) and 1250 g ATEVA 2830A ethylene vinyl acetate.

Example 3

A thermoplastic composition is prepared that includes 300 g ECOFLEX F BX 7011 aliphatic-aromatic copolyester (BASF) and 100 g ATEVA 2830A ethylene vinyl acetate.

Example 4

A thermoplastic composition is prepared that includes 300 g ECOFLEX F BX 7011 aliphatic-aromatic copolyester (BASF) and 100 g ATEVA 1850A ethylene vinyl acetate (AT Plastics).

Example 5

A thermoplastic composition is prepared that includes 340 g ECOFLEX F BX 7011 aliphatic-aromatic copolyester (BASF) and 60 g ATEVA 2830A ethylene vinyl acetate (AT Plastics).

Example 6

A thermoplastic composition is prepared that includes 340 g ECOFLEX F BX 7011 aliphatic-aromatic copolyester (BASF) and 60 g ATEVA 3325AC ethylene vinyl acetate (AT Plastics).

Example 7

A thermoplastic composition is prepared that includes 250 g ECOFLEX F BX 7011 aliphatic-aromatic copolyester (BASF) and 250 g LEVAMELT 456 ethylene vinyl acetate (Bayer).

Control 2

Neat ECOVIO L BX 8145 a compound of aliphatic-aromatic copolyester and polylactic acid polyester (BASF)

Example 8

A thermoplastic composition is prepared that includes 2250 g ECOVIO L BX 8145 a compound of aliphatic-aromatic copolyester and polylactic acid polyester (BASF) and 750 g ATEVA 2830 A ethylene vinyl acetate (AT Plastics).

Control 3

Neat NATUREWORKS 6251 D polylactide resin (NatureWork LLC)

Example 9

A thermoplastic composition is prepared that includes 2100 g NATUREWORKS 6251D polylactide resin (NatureWork LLC) and 900 g ATEVA 2830A ethylene vinyl acetate (AT Plastics).

TABLE 1

| Example | % by weight polyester | % by weight ethylene vinyl acetate | Melt Index of the composition (g/10 min) (at 190° C.) | DSC Melt Peak(s) (°C.) |
|---|---|---|---|---|
| Control 1 | 100 | 0 | 8.2 | 119.9 |
| 1 | 50 | 50 | ND | ND |
| 2 | 75 | 25 | ND | ND |
| 3 | 75 | 25 | 30.6 | 68.7, 120.4 |
| 4 | 75 | 25 | 26.6 | 83.7, 118.9 |
| 5 | 85 | 15 | 12.8 | 70, 118.9 |
| 5 | 85 | 15 | ND | ND |
| 6 | 85 | 15 | 10.7 | 63.9, 118.9 |
| 7 | 50 | 50 | 15.9 | ND |
| Control 2 | 100 | | <2.5 | 140-155 & 110-120* |
| 8 | 75 | 25 | 41.6 | 154.6 |
| Control 3 | 100 | | 52.3** | 160-170*** |
| 9 | 70 | 30 | 109.8 | 170.3 |

ND = Not Determined
*according to the Product Information for ECOVIO L BX 8145 (BASF Chemical Company).
**measured in the lab at 190° C. According to the product information for NATUREWORKS PLA Polymer 6251 D (NatureWork LLC), melt index at 210° C. is 70-85 g/min.
***according to the product information for NATUREWORKS PLA Polymer 6251 D (NatureWork LLC).

The compositions of Examples 1-9, when extrusion coated through a single screw extruder at a temperature of from about 425° F. to about 500° F. and a coat weight of from 50 g/m² to 100 g/m² on to a wallpaper substrate, are expected to permeate a distance into the thickness of the substrate and form good mechanical and adhesive bonds therewith. The coated surface of the wallpaper is expected to be stain resistant, water resistant, cleanable, and printable.

The compositions of Controls 1 and 2 are very viscous, therefore, would not be easily coated on a substrate at a relatively low coat weight such as from about 50 g/m² to about 60 g/m². The composition of Control 3 is too brittle, therefore, would not be suitable for a flexible coating on a substrate.

All of the patents and patent applications cited above are incorporated into this document in total to the extent that they do not conflict with the statements contained herein. Other embodiments are within the claims.

What is claimed is:
1. A coated substrate comprising
a substrate, and
a coating composition disposed on the substrate, the coating composition comprising
at least about 40% by weight a polyester comprising at least one of an aliphatic-aromatic copolyester, a polylactic acid polyester, and a compound of an aliphatic-aromatic copolyester and a polylactic acid polyester, and
at least about 10% by weight a thermoplastic polymer that is different from the aforesaid polyester and that has a melt index of at least 40 g/10 min at 190° C., wherein the coating composition has a melt index greater than the melt index of the polyester.

2. The coated substrate of claim 1, wherein the composition comprises from about 40% by weight to about 90% by weight the polyester and from about 10% by weight to about 60% by weight the thermoplastic polymer.

3. The coated substrate of claim 1, wherein the polyester is an aliphatic-aromatic copolyester that has a melt index of no greater than 40 g/10 min at 190° C.

4. The coated substrate of claim 1, wherein the polyester is a polylactic acid polyester that has a melt index of at least about 10 g/10 min at 190° C.

5. The coated substrate of claim 1, wherein the polyester is a compound of aliphatic-aromatic copolyester and polylactic acid polyester, which has a melt index of at least about 2 g/10 min at 190° C.

6. The coated substrate of claim 1, wherein the thermoplastic polymer comprises ethylene vinyl acetate copolymers, polyamides including polyether copolyamides, copolymers of acrylic acid, ethylene copolymers of acrylic acid, polyolefins, modified polyethylene, modified polypropylene, styrene block copolymers, non-biodegradable polyesters including polyether copolyesters, and combinations thereof.

7. The coated substrate of claim 1, wherein the coating composition exhibits a moisture vapor transmission rate of at least 100 g/m2/day.

8. The coated substrate of claim 1, wherein the substrate comprises paper, woven fabric, nonwoven webs, polymer films, laminates, and combinations thereof.

9. The coated substrate of claim 1, wherein the coating composition further comprising at least one components comprising fire retardants, fillers, plasticizers, wax, and combinations thereof.

10. The coated substrate of claim 1, wherein the coated substrate is wallpaper.

11. A method of making the coated substrate of claim 1, comprising applying the coating composition to the substrate.

12. The method of claim 10, wherein the composition is applied as a coating at a coat weight of at least about 25 g/m2.

13. A coated substrate made by the method of claim 11.

14. A thermoplastic composition comprising:
at least about 40% by weight of a polyester comprising at least one of an aliphatic-aromatic copolyester, a polylactic acid polyester having a melt index of at least about 10 g/10 min at 190° C., and a compound of an aliphatic-aromatic copolyester and a polylactic acid polyester, and
at least about 10% by weight of a thermoplastic polymer having a melt index of at least about 40 g/10 min at 190° C.,
wherein thermoplastic composition has a melt index greater than the melt index of the polyester.

15. The composition of claim 14, wherein the polyester is an aliphatic-aromatic copolyester that has a melt index of no greater than 40 g/10 min at 190° C.

16. The composition of claim 14, wherein the polyester is a compound of an aliphatic-aromatic copolyester and a polylactic acid polyester, which has a melt index of at least about 2 g/10 min at 190° C.

17. The composition of claim 14, wherein the polyester is a polylactic acid polyester that has a melt index of at least about 20 g/10 min at 190° C.

18. A method of coating a substrate with the composition of claim 14, comprising applying the composition to the substrate to form a coating on the substrate.

19. An article comprising a substrate and a coating disposed on the substrate, wherein the article is made by the method of claim 18.

* * * * *